United States Patent [19]

Kuszyncki et al.

[11] 3,980,247
[45] Sept. 14, 1976

[54] SAFETY BELT RETRACTOR

[75] Inventors: Gregory G. Kuszyncki, Pasadena; William S. Wright, Jr., Corona Del Mar; Akira Tanaka, Northridge, all of Calif.

[73] Assignee: American Safety Equipment Corporation, Encino, Calif.

[22] Filed: Apr. 17, 1975

[21] Appl. No.: 568,927

[52] U.S. Cl. .................. 242/107.4 B; 242/107.4 A
[51] Int. Cl.² ........................................ B65H 75/48
[58] Field of Search ............ 242/107.4 R, 107.4 A, 242/107.4 B; 297/388; 280/150 SB

[56] References Cited
UNITED STATES PATENTS

| | | | |
|---|---|---|---|
| 3,834,646 | 9/1974 | Heath | 242/107.4 A |
| 3,862,726 | 1/1975 | Ulrich | 242/107.4 B |
| 3,873,041 | 3/1975 | Rumpf | 242/107.4 R |
| 3,883,089 | 5/1975 | Close | 242/107.4 B |

*Primary Examiner*—Edward J. McCarthy
*Attorney, Agent, or Firm*—Poms, Smith, Lande & Glenny

[57] ABSTRACT

A safety belt retractor having a frame, a strap receiving reel mounted for rotation on the frame with the reel being urged into a strap wound position and a pawl having a tab for engaging the teeth of a ratchet wheel. Inertia responsive means are associated with the pawl which is normally biased into a position out of engagement with the wheel, the inertia responsive means being responsive to a first rate of acceleration of the strap off the reel for causing the pawl tab to engage with the teeth. The inertia responsive means is selectively prevented from causing the tab to engage with the teeth upon a second rate of acceleration of the strap off of the reel above the first rate of acceleration during protraction of the strap off of the reel while permitting operation of the inertia responsive means upon acceleration of the strap off of the reel at a third rate of acceleration higher than the second rate of acceleration and is responsive to a retractive movement of the reel after unwinding of a predetermined amount of the strap off of the reel to release the inertia responsive means for engagement of the tab with the ratchet wheel teeth upon acceleration of the strap off of said reel at the first rate of acceleration.

17 Claims, 7 Drawing Figures

SAFETY BELT RETRACTOR

BACKGROUND OF THE INVENTION

1. Field of the Invention

The invention relates to improvements in safety belt devices, and, more particularly, to self-retracting safety belt retractors for use on vehicles or the like.

2. Description of the Prior Art

Safety belt retractors of the type disclosed herein have been developed over the years for use in aircraft, automobiles, and similar vehicles or the like. These retractors generally combine a frame or casing having a spindle-supported reel thereon with a belt or strap automatically wound thereon and unwound therefrom in response to movement of the user. Such reels normally include a rewind to wind the belt or strap back onto the reel and cooperating locking means acting to lock the reel against rotation in case the strap, and hence the user, moves with respect to his seat at an excessive and dangerous acceleration.

However, it is desirable on such retractors to make the reel "free spooling", i.e., the belt or strap mounting reel cannot accidentally lock up due to excessive acceleration of the strap during an initial protraction thereof by the user prior to buckling the safety belt into a condition of normal use, the reel thereafter locking upon a predetermined strap or belt acceleration. Certain prior art safety belt retractors that attempted to accomplish this normally have provided for only limited "free spooling" during only a given number of initial unwinding turns of the reel on protraction of the strap. Other prior art retratractors have provided unlocking discs frictionally driven by the reel and acting directly on the locking bar to hold it unlocked during protraction. The former have the disadvantage of possible premature locking while the latter have introduced an undesirable friction drag during pulling out of the strap.

SUMMARY OF THE INVENTION

It is an object of this invention to provide a safety belt retractor whereby the belt or strap may be freely pulled therefrom without the possibility of any accidental lockup of the belt or strap due to the user's accelerating the belt or strap within a predetermined lockup acceleration rate when placing the belt or strap in use and which does not introduce undesirable drag or frictional forces.

It is a further object of this invention to provide such a retractor where, upon slight retraction of the belt or strap, the belt or strap locking means will be free to lock up upon acceleration of the strap above a predetermined lockup acceleration rate.

It is still another object of this invention to provide a safety belt retractor which includes inertia responsive means responsive to sudden acceleration of a strap off of the reel thereof for causing the reel to lock up, yet such means is selectively prevented from so locking up during protraction of the strap off of the reel within a predetermined lockup acceleration rate while retaining its ability to lock up if the strap is unwound off of the reel above a predetermined lockup accleration rate.

These and other objects are preferably accomplished by providing a safety belt retractor having a frame, a strap receiving reel mounted for rotation on the frame with the reel being urged into a strap wound position and a pawl having a tab for engaging the teeth of a ratchet wheel. nertia responsive means are associated with the pawl and are responsive to a first rate of acceleration of the strap off the reel for causing the pawl tab to engage with the teeth. The inertia responsive means is selectively prevented by blocking means from causing the tab to engage with the teeth upon a second rate of acceleration of the strap off of the reel above the first rate of acceleration during protraction of the reel while permitting operation of the inertia responsive means upon acceleration of the strap off of the reel at a third rate of acceleration higher than the second rate of acceleration and is responsive to a retractive movement of the reel after unwinding of a predetermined amount of the strap off of the reel to release the inertia responsive means for engagement of the tab with the ratchet wheel teeth upon acceleration of the strap off of the reel at the first rate of acceleration.

DESCRIPTION OF THE PREFERRED EMBODIMENT

Figure 1:
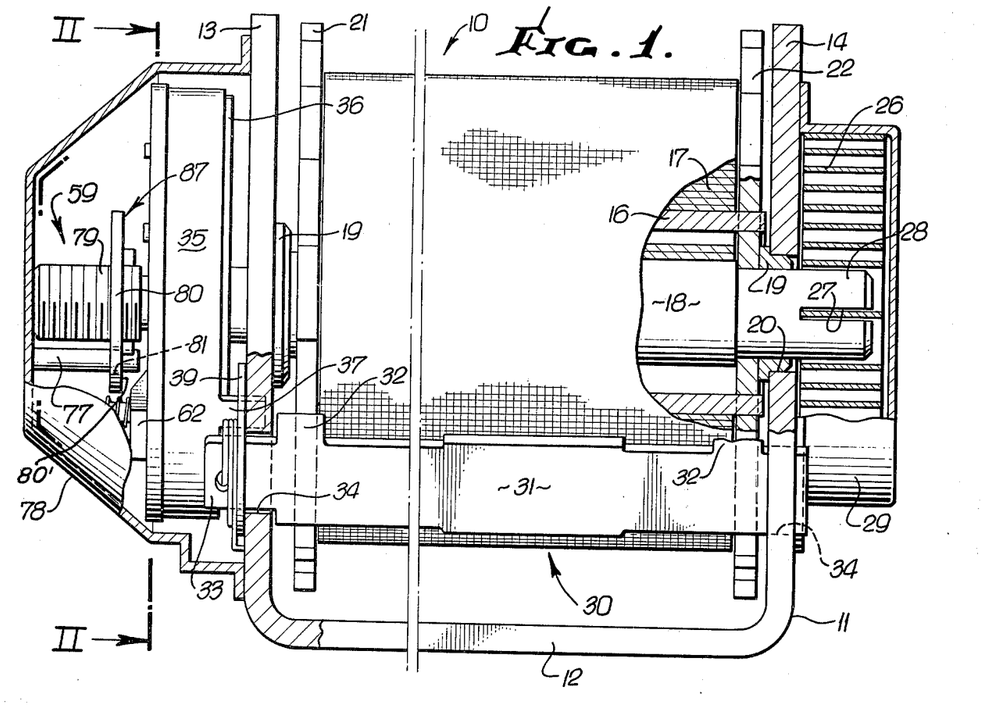
FIG. 1 is a vertical cross-sectional view of the safety belt retractor of this invention.
Figure 2:
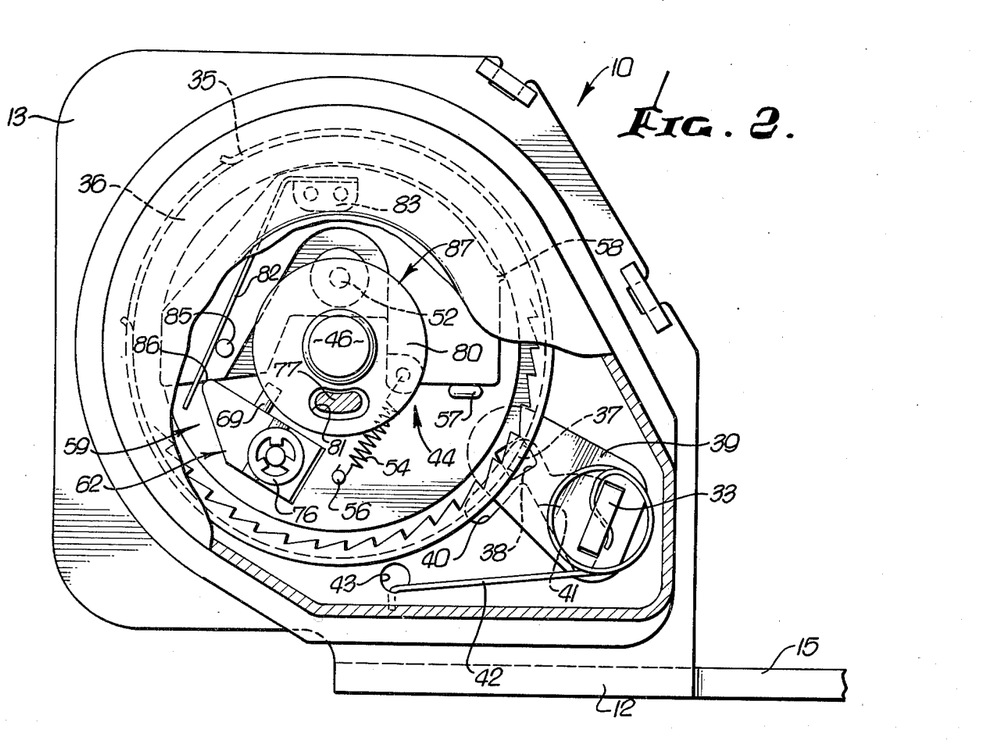
FIG. 2 is a side view with portions thereof omitted for convenience of illustration of the safety belt retractor of FIG. 1, taken along lines II—II thereof.
Figure 3:
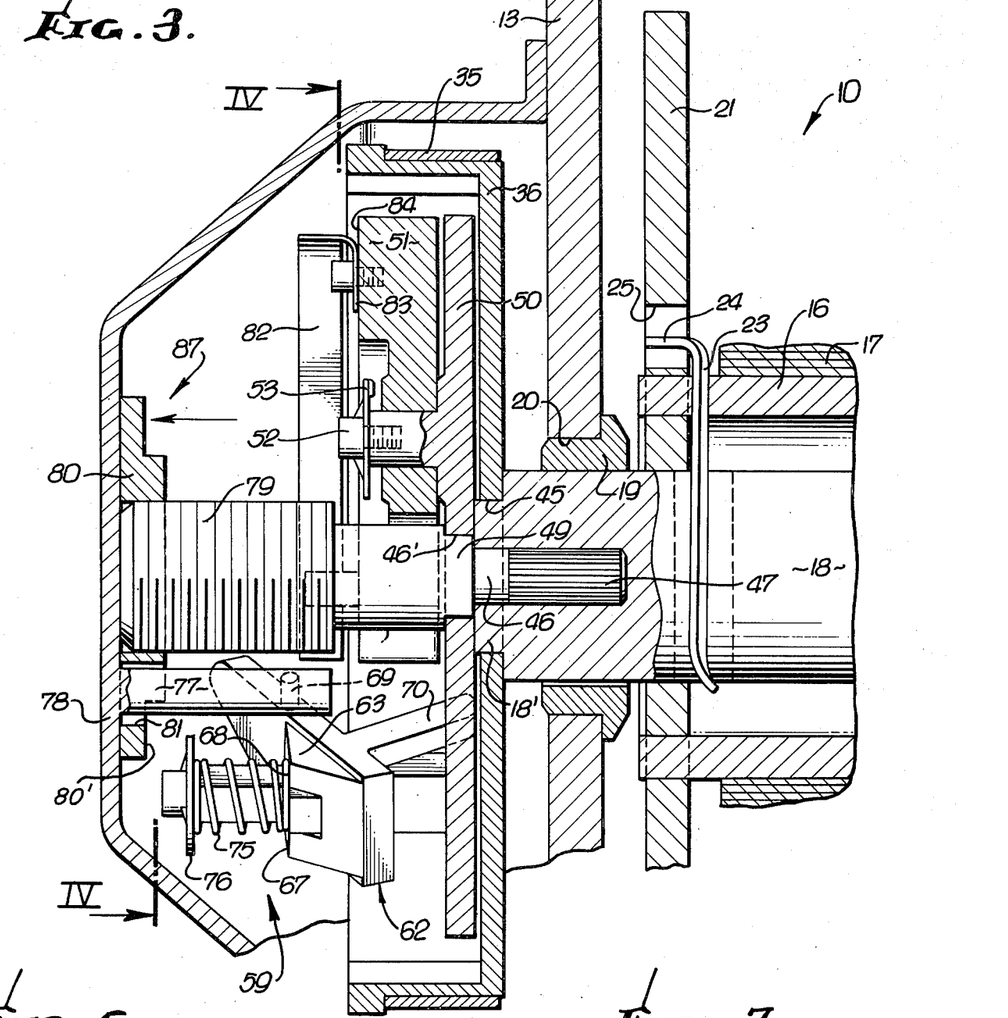
FIG. 3 is a vertical cross-sectional view of a portion of the retractor of FIG. 2.

Referring now to the drawing, and more particularly to FIGS. 1 through 3, the general configuration of the seat belt retractor indicated generally at 10 of the present invention will be described. The retractor 10 includes a housing, indicated generally at 11, which comprises a base 12 and a pair of side walls 13 and 14. It can be seen with reference to FIG. 2 that base 12 may include an extension portion 15 which may have a suitable aperture therein (not shown) for securing retractor 10 to a desired support in a vehicle, such as the frame of the vehicle or the like.

The retractor 10 further includes a reel 16 on which a strap 17 is wound when retracted and from which the strap may be unwound. The reel 16 of the retractor 10 may be rotatably supported relative to the housing 11 through a shaft 18 journaled in bushings 9 disposed in openings 20 in the side walls 13, 14 of housing 11. It is to be understood that the free end of strap 17 is adapted to extend outwardly of reel 16 for attachment to the user's shoulder harness or the like (not shown).

Reel 16 also carries ratchet wheel means which may comprise a pair of ratchet wheels 21, 22. In the exemplary embodiment, such ratchet wheels 21, 22 are adapted to prevent rotation of reel 16 in one direction, such as the direction which would permit protraction of the strap 17 as will be more fully explained hereinafter. The shaft 18 thus passes through reel 16 and is secured against axial movement relative to the housing 11 by a spring member or retainer 23 (FIG. 3) interposed between the ratchet wheel 21 and shaft 18 with a leg portion 24 engaged in a slot 25 provided in wheel 21 which retains shaft 18 in place within reel 16.

The retractor 10 also includes a windup spring 26 (FIG. 1) which is secured at its inner end to a slot 27 provided in a reduced end portion 28 of shaft 18 and by its outer end fixed to the inner wall of a spring cup 29. The spring 26 constantly biases the reel 16 in a counterclockwise direction (as viewd in FIG. 2) so as to constantly bias the strap 17 toward full retraction.

Retractor 10 also includes retractor locking means, indicated generally at 30, in FIG. 1, which means includes a ratchet wheel pawl 31, engaging tabs 32 and laterally extending pivot arms 33 (FIG. 2) received in openings 34 in side walls 13, 14 for pivotal movement of pawl 31. The retractor locking means 30 further includes a clutch spring 35 (FIGS. 2 and 3) surrounding the outer periphery of a circular cup member 36. Clutch spring 35 has a lug or tab 37 (FIG. 2) projecting therefrom which tab 37 extends into a slot 38 formed in a biasing spring lever member 39 as shown in FIG. 2 to provide a stop as will be discussed further hereinbelow and into an opening 40 formed in side wall 13. Lever member 39 is of substantially flat shape and opening 40 is provided with an inclined portion 41 for conformably receiving the pivot arms 33 therein. An elongated spring member 42 is secured at one end in an opening 43 in side wall 13 and extends about and is secured at its other end to pivot arm 33. Thus, the tabs 32 of pawl 31 are normally biased out of locking engagement with the teeth of ratchet sheels 21, 22.

Inertia responsive means, indicated generally at 44 (FIGS. 2 and 4), are provided for actuating clutch spring 35 to thereby lock pawl 31 into engagement with ratchet wheels 21, 22. Such inertia responsive means includes the aforementioned cup member 36 which has a centrally located aperture 45 surrounding a reduced portion 18' of shaft 18 (FIG. 3). A stub shaft 46 extends through an aperture in portion 18' and is press-fit or the like at one end 47 in a suitable aperture in shaft 18. The interior peripheral surface of cup member 36 is provided with ratchet teeth 48 (FIG. 4) for reasons to be discussed shortly.

Stub shaft 46 includes a second portion 49 of larger diameter than end 47 conformably fitting into a like configured aperture 46' (see also FIG. 5) in the hub of a generally circular flange member 50 so that flange member 50 turns with shafts 18 and 46 in use.

The inertia responsive means 44 further includes an inertia member or plate 51 (see particularly FIG. 4) turnably mounted on a cylindrical boss 52 extending flange member 50 and radially offset from the axes of shaft 18. It is to be understood that the axis of boss 52 passes through the center of gravity of plate 51. A lock washer 53 may be provided on boss 52 to retain plate 51 in position thereon.

A coil calibration tension spring 54 has one end thereof connected to an aperture 55 in inertia plate 51 and has its other end connected to a boss 56 provided on flange member 50 and acts to normally hold inertia plate 51 in position. As will be discussed further hereinbelow, the tension of calibration spring 54 determines the g settings, i.e., the acceleration of gravity, of the retractor 10. This may be about 0.7 g's, for example. Flange member 50 further includes a stop member 57 for limiting the movement of plate 51.

One or more ratchet teeth 58 are provided on the outer peripheral surface of inertia plate 51 and are adapted to engage the teeth 48 of cup member 36.

Before proceeding to describe pawl lockup preventing means for preventing the inertia responsive means, indicated generally at 44, from causing the pawl 31 to engage with the teeth of ratchet wheels 21, 22 upon acceleration of the strap 17 out of the reel 16 below a predetermined acceleration, the operation of the inertia responsive means, indicated generally at 44, will be described.

The aforementioned clutch spring 35 embraces the outer cylindrical surface of cup member 36 and resiliently grips this surface with a definite predetermined pressure. Thus, clutch spring 35 and cup member 36 constitute a preloaded clutch, whereby the clutch spring 35 tends to turn with cup member 36 but will slip thereon if held against turning by a force exceeding a predetermined amount.

It can be seen that in the event of a crash resulting in a sudden deceleration of the vehicle in which retractor 10 is mounted, the user's body tends to be thrown forward suddenly so that the strap 17 starts to pay out of reel 16 with acceleration. Depending upon the tension of calibration spring 54, if a predetermined dangerous acceleration of the user's body is reached, the inertia plate 51 will tend to maintain its original velocity and hence will turn with respect to its pivotal support on boss 52, thus turning counterclockwise as viewed in FIG. 4 to the position shown in FIG. 4 against the tension of spring 54 so that its ratchet teeth 58 engage teeth 48 on cup member 36 due to the eccentric mounting of plate 51 with respect to shaft 18. Thus, cup member 36 is now caused to turn clockwise within reel 16, and clutch spring 35 turning therewith moves via tab 37 within slot 38 thereby moving lever member 39 and pawl 31. The tabs 32 of pawl 31 are thus urged by spring member 42 to lock the ratchet wheels 21, 22 simultaneously to prevent further payout of strap 17. With reel 16 so locked and held firmly at both ends, the shaft 18 is relieved of high torsional loads which otherwise would occur were reel 16 locked at one end only, so that retractor 10 is capable of withstanding enormous strap loads in use.

Once the force on strap 17 is relieved, then it will retract automatically through the action of rewind spring 26. As the spring 26 starts to rewind, the flange member 50 will start to turn counterclockwise, as viewed in FIG. 2, causing the teeth 58 of inertia plate 51 to disengage from the teeth 48 of cup member 36, and calibration spring 54 will turn plate 51 back to its original position (see FIG. 2) abutting against boss stop member 57. The return of inertia plate 51 will also move clutch spring 35 back to its original position in FIG. 2 whereby lever member 39 and spring 42 returns pawl 31 to its original position. This of course unlock tabs 32 from the teeth of ratchet wheels 21, 22 placing reel 16 in condition for another locking operation when required. There is no possibility of retractor 10 locking during windup of spring 26.

As particularly contemplated within the present invention, pawl lockup preventing means are provided for preventing the inertia responsive means, indicated generally at 44, from causing the pawl 31 to engage with the teeth of ratchet wheels 21, 22 upon acceleration of the strap 17 out of the reel 16 below a predetermined acceleration. In the exemplary embodiment, as seen particularly in FIGS. 1 through 5, such pawl lockup preventing means, indicated generally at 59, includes a pair of spaced slots 60, 61 formed in flange member 50 (see particularly FIG. 5). An actuator lever 62 (see particularly FIG. 5) is provided having an upper main body portion 63 which includes a generally right triangular portion 64 integral with a generally square-shaped portion 65. A generally rectangularly-shaped aperture 66 extends through portion 65. A pair of spaced bosses 67, 68 extend upwardly from the upper surface of portion 65 on each side of the longer sides of aperture 66. A tab 69 extends outwardly from one side of portion 65. Finally, a pair of spaced legs 70, 71 extend downwardly from portion 65 on each side of aperture 66.

Figures 4, 5:
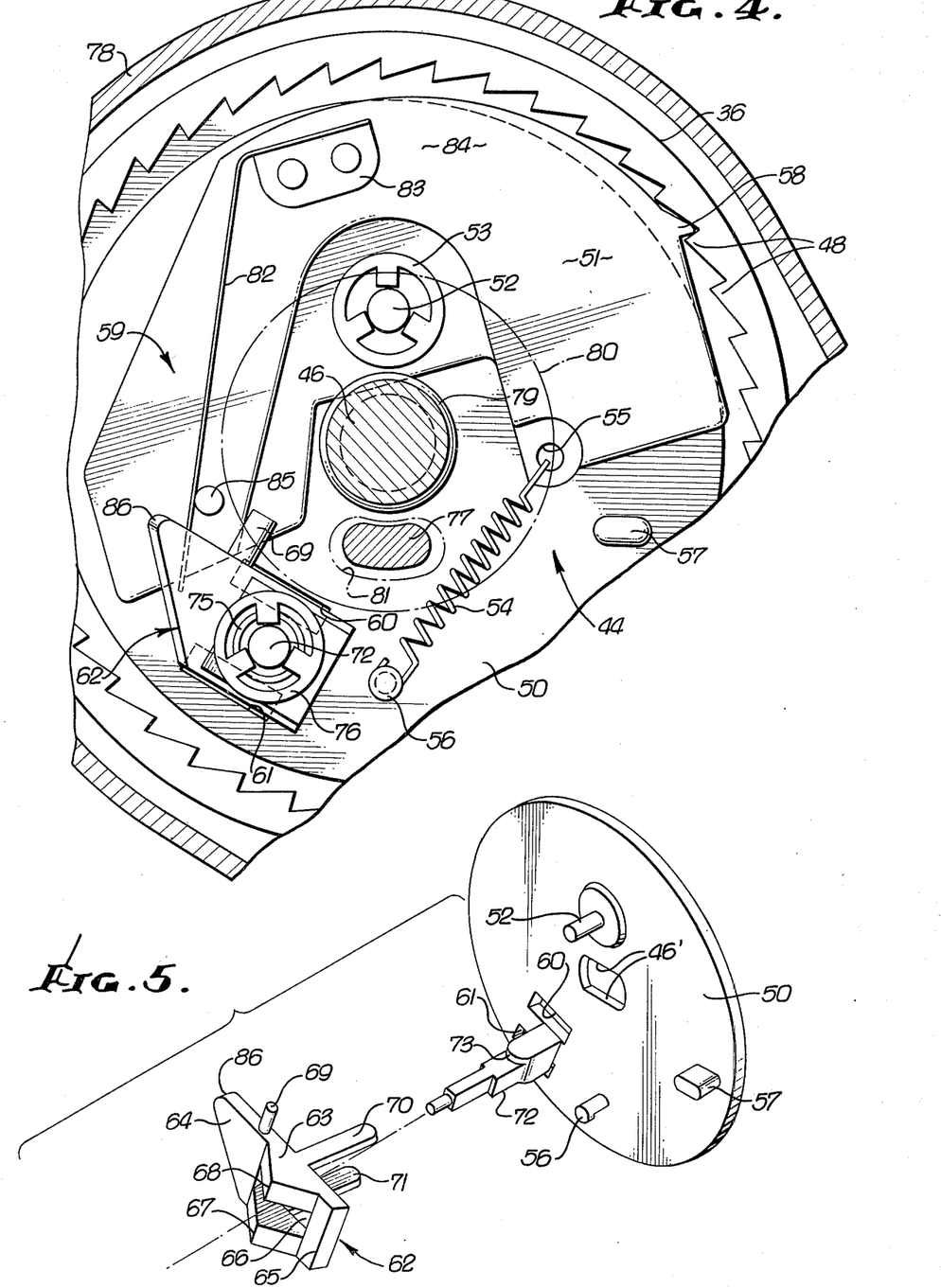
FIG. 4 is a side cross-sectional view of the retractor of FIGS. 1 - 3 taken along lines IV—IV of FIG. 3.
FIG. 5 is an exploded view of a portion of the retractor of FIGS. 1 through 4.

The pawl lockup preventing means, indicated generally at 59, further includes a post 72 extending from the surface of flange member 50 (see particularly FIG. 5). As can be seen in FIGS. 3, 5 and 7, lever 62 is adapted to be inserted on post 72 with post 72 extending through aperture 66. Lever 62 is thus mounted over-center with respect to post 72. A stop or fulcrum point 73 (see FIG. 5) may be provided on post 72 for maintaining lever 62 thereon in such a manner that legs 70, 71 enter the slots 60, 61 in flange member 50 and are movable therein. It is to be understood, as shown more particularly in FIGS. 6 and 7 that the free ends of legs 70, 71 bear against the surface 74 of cup member 36. This surface 74 may be roughened or the like to increase frictional contact between legs 70, 71 and cup member 36, which assists in keeping lever 62 down until it is reversed as will be discussed hereinbelow. A helical spring 75 may surround the upper end of post 72 with a lock washer 76 retaining spring 75 on post 72, thus resiliently biasing lever 62. Spring 75 is an over-center spring which also assists in keeping lever 62 out of pawl lockup preventing position until subsequently moved back into pawl lockup preventing position as will be discussed hereinbelow.

The pawl lockup preventing means, indicated generally at 59, further includes an elongated member 77 (FIGS. 1 through 3) extending inwardly from a housing 78 secured to side wall 13 which housing 78 retains the various components therein. Member 77 is generally coaxially aligned with stub shaft 46. The free end of stub shaft 46 is threaded at threaded portion 79.

The pawl lockup preventing means, indicated generally at 59, further includes a strap state sensing means, indicated generally at 87, for sensing the rolled-up condition of strap 17 on reel 16. Thus, as particularly contemplated within the present invention, in the exemplary embodiment, such strap state sensing means as shown in FIGS. 1 through 3 includes a nut 80 threadably mounted on the threaded portion 79 of shaft 46. Nut 84 includes at least one cut-out portion 81 configured to receive member 77 therethrough as seen in FIG. 2. In this manner, nut 80 remains stationary when stub shaft 46 is rotated as will be discussed further hereinbelow.

It can be seen in FIG. 2 that nut 80 is of such a size that it overlaps the tab 69 of actuator lever 62. Further, as shown in FIG. 1, lever 62 is disposed between nut 80 and flange member 50 for reasons which will be discussed shortly. The engagement of a camming portion 80' of nut 80 with lever 62 holds lever 62 in a strap state sensing position, as will be discussed shortly, whereby relatively "free pull" of strap 17 off of reel 16 is possible until after a predetermined amount of strap 17 is unwound from reel 16.

The pawl lockup preventing means, indicated generally at 59, further includes an elongated leaf spring 82 (see particularly FIGS. 2 and 4) having one end secured to a flange 83 fixedly secured on the upper surface 84 of inertia plate 51. The free end of leaf spring 82 abuts against a stop member 85 depending upwardly from the upper surface 84 of inertia plate 51 and extending toward housing 78. The tip 86 of lever 62 is disposed adjacent the terminal end of spring 82 and either abuts against spring 82 or is in a position adapted to be engaged by spring 82 as shown in FIG. 2.

In operation, and with particular reference to FIGS. 1 through 4, it will be seen that when the strap 17 is fully wound onto reel 16 prior to being extending therefrom, nut 80 is in its position in FIGS. 1 and 2 and camming portion 80' overlies tab 69 on lever 62. The tip 86 of lever 62 is disposed in position to engage the terminal end of leaf spring 82.

It should be noted as discussed heretofore that the calibration spring 54 may be preset at some relatively low g-setting, as for exampple, 0.7 g's. The leaf spring 82 may be set at some relatively higher g-setting, as for example, 2.5 g's. This latter g-setting is preferably high enough that it is not irritating to a user and that a user may freely pull strap 17 off of reel 16 with a relatively high pull force, but low enough that the reel 16 will lock up if some greater pull force takes place, as for example, 15 g's, such as that taking place upon a vehicular accident or the like.

Thus, it should be appreciated that if the inertia responsive means, indicated generally at 44 and heretofore described, were activated upon vehicular impact or the like, the weight of inertia plate 51 would overcome the combined g-settings of springs 54 and 82 and move into locking position with cup member 36 as heretofore described. Release of strap 17 would then activate return spring 26 to move plate 51, thereby releasing plate 51 from locking engagement with cup member 36 also as heretofore described. The normal resilience of spring 42 releases pawl 31 from engagement with wheels 21, 22 as is well known in the seat belt art.

However, if such excessive pulling force does not take place, strap 17 may be payed out of reel 16 with an acceleration rate below the predetermined rate discussed hereinabove. As shaft 18 rotates, it also rotates stub shaft 46. Nut 80 moves from its position in FIG. 1 to the position shown in FIG. 3 thus no longer blocking lever 62. Until nut 80 releases lever 62 so that the lever 62 is free of abutment with spring 82, strap 17 is freely spooled out of reel 16 so long as the heretofore discussed acceleration does not take place.

The movement of nut 80 away from lever 62 takes place only after a predetermined amount of strap 17 is unwound off of reel 16. Thus, the strap state sensing means, indicated generally at 87, prevents lockup of reel 16 until nut 80 disengages from lever 62, unless a very high rate of acceleration takes place, as for example, the aforementioned acceleration of gravity of about 15 g's, or that taking place in a vehicular accident.

Figure 6:
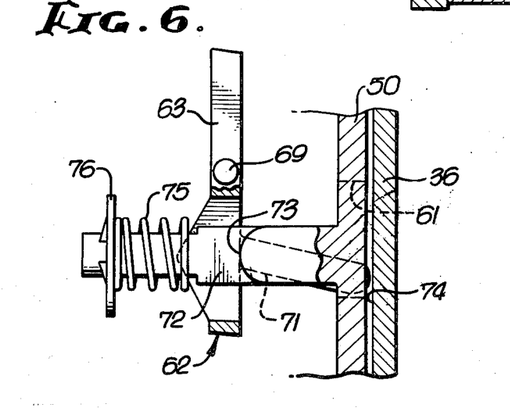
FIG. 6 is a detailed cross-sectional view of a portion of the retractor of FIGS. 1 through 5 showing one position of various parts thereof.
Figure 7:
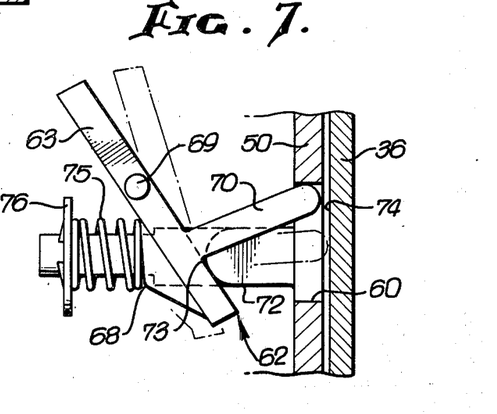
FIG. 7 is a view similar to FIG. 6 showing another position of the same elements thereof.

That is, as the camming portion 80' of nut 80 moves away from engagement with lever 62, since the engagement of legs 70, 71 of lever 62 with the surface 74 of cup member 36 keeps lever 62 down as shown in FIG. 6, any slight retraction of strap 17 will cause the legs 70, 71 of lever 62 to move in slots 60, 61 of flange member 50, assisted by the overcentering spring 75, and pivot as indicated by the movement of lever 62 from the dotted line to the solid line position in FIG. 7. The final position of lever 62 and the relationship of the other components of retractor 10 is also shown in FIG. 4. The inertia plate 51 is now in position to be activated by any force exceeding the g-setting of calibration spring 54. Thus, until nut 80 moves out of blocking position with lever 62, plate 51 is only activated by the combined g-setting of springs 54 and 82. Once the predetermined amount of strap 17 is payed out of reel 16, nut 80 releases lever 62 so that plate 51 may be activated. The reel 16 will now lock up with a lesser acceleration rate taking place than the initial pull of strap 17 from reel 16. That is, the pawl lockup preventing means, indicated generally at 59, changes the sensitivity level required to activate inertia responsive means, indicated generally at 44, between the first and subsequent pulls of strap 17 out of reel 16. Once lever 62 pivots out of position where it no longer can engage spring 82, the inertia plate 51 is free to lock up under acceleration rates that are lower than the combined acceleration rate of the springs 54 and 82.

Nut 80 also acts as a resetting member for lever 62. That is, as rewind spring 26 rewinds reel 16, nut 80 returns to its position in FIG. 1. As the camming portion 80' of nut 80 engages the tab 69 on lever 62, it pushes lever 62 back to its position in FIGS. 1 and 2 when it is once again in position adapted to engage leaf spring 82. It can be seen that in the improved seat belt retractor of our invention disclosed hereinabove, lockup of the reel will always take place if acceleration above a predetermined level takes place. This level is determined by the g forces of the springs involved and is set high enough to permit most users to pull the strap off of the reel with a reasonable amount of acceleration, but low enough so that this g force will be overcome and the reel will lock up if a degree of acceleration related to that acceleration taking place upon vehicular impact or the like occurs. The seat belt retractor disclosed hereinabove is not totally "free pull", but the strap may be freely pulled from the reel within a relatively high rate of acceleration.

In summary, it can be seen from the foregoing that upon actuation of inertia plate 51 at a first rate of acceleration, a positive quick engagement takes place to lock reel 16 from further paying out of the strap 17. However, pawl lockup preventing means are provided for retaining inertia plate 51 in nonlocking condition with cup member 36 during protraction of strap 17 from reel 16 within a second rate of acceleration lower than the first. When strap 17 is fully wound up on reel 16, a strap state sensing means 87 in the form of the engagement of the nut 80 with lever 62 holds the inertia plate 51 from locking engagement with cup member 36 within this predetermined rate of acceleration. At the same time the pawl lockup preventing means, indicated generally at 59, retains inertia plate 51 from movement into locking engagement with cup member 36 even when the aforementioned strap state sensing means has become inactive. Upon a slight retraction of the strap, this means 59 is disengaged and the inertia responsive means is now in to be activated by acceleration of the strap at the first rate of acceleration to move lever member 39 and pawl 31 carried thereby so as to lock the tabs 32 of pawl 31 into engagement with the teeth of ratchet wheels 21, 22. Spring member 42 urges pawl 31 out of locking engagement. There is thus no possibility of accidental lockup before the strap is payed out due to rate of acceleration by the user within predetermined limits.

It can be seen from the foregoing that an improved seat belt device or the like is described having novel means for permitting relatively free pull of the strap from the assembly while both the rolled-up condition of the strap on the reel of the device is being sensed and the inertia operated locking means is prevented from actuation below a predetermined rate of acceleration. However, once the strap is payed out and retracted, the inertia operated locking means is released to thus lock up the reel immediately upon acceleration of the strap at the first rate of acceleration.

It will be seen from the foregoing description of the structure and operation of an exemplary embodiment of the present invention that all of the above-mentioned objects are accomplished by the instant system. Of course, modifications, alterations and variations of the seat belt retractor may be made by persons skilled in the art which come within the scope of the present invention.

I claim:

1. In a safety belt retractor having a strap receiving reel mounted for rotation in a frame with said reel being urged into a strap wound position and including a pawl having at least one locking tab thereon adapted to engage the teeth of a ratchet wheel on the reel, inertia responsive means associated with said pawl and responsive to acceleration of said strap off said reel at a first rate of acceleration for causing said tab to engage with said teeth, said inertia responsive means including an inertia plate movable within a plane of movement from a position out of locking engagement to a position causing said tab to engage with said teeth when said first rate of acceleration is reached, the improvement comprising the provision of:

pawl lock-up preventing means associated with both said reel and said inertia responsive means for selectively preventing said inertia responsive from causing said tab to engage with said teeth upon acceleration of said strap off of said reel within a second rate of acceleration thereof above said first rate of acceleration while permitting operation of said inertia responsive means upon acceleration of said strap off of said reel at a third rate of acceleration higher than said second rate of acceleration, said inertia plate having an unobstructed path of movement within said plane of movement during the time said pawl lock-up preventing means prevents said inertia responsive means from causing said tab to engage with said teeth upon accelerration of said strap off of said reel within said second rate of acceleration above said first rate of acceleration while permitting operation of said inertia responsive means upon acceleration of said strap off of said reel at said third rate of acceleration.

2. In the retractor of claim 1 further including means for releasing said inertia responsive means for engagement of the tab with said teeth upon acceleration of said strap off of said reel at said first rate of acceleration after a predetermined amount of said strap has beeen inwound off of said reel.

3. In the retractor of claim 2 wherein said last-mentioned means is responsive to a retractive movement of said reel after unwinding of a predetermined amount of said strap off of said reel to thereby release said inertia responsive means.

4. The improvement in the retractor of claim 3 wherein said pawl lock-up preventing means further includes resilient means fixedly mounted on said plate and a flange connected to said reel for rotation therewith, a pivoted member, and means for mounting said pivoted member for positioning a first portion of said pivoted member in a position adapted to engage said resilient means, and a second portion in surface engagement with said flange, whereby, during protraction of said strap, said pivoted member is urged into a position adapted to engage said resilient means and, upon a retractive movement, is urged by engagement between said flange and said second portion out of said position whereby said flange and said second portion out of said position whereby said pivoted member is adapted to engage said resilient means.

5. The improvement in the retractor of claim 4 wherein said pawl lock-up preventing means further includes strap state sensing means which comprises a nut threadably mounted on said retractor and axially movable in a direction away from said pivoted member when said strap is unrolled off said reel, said nut having a camming portion thereon movable from a first position adapted to engage said pivoted member means prior to said strap being unrolled off said reel to a second position whereby said camming portion moves to a position releasing said pivoted member from a position adapted to engage said resilient means when a predetermined amount of said strap is unrolled off said reel.

6. The improvement in the retractor of claim 4 wherein said resilient means includes a spring member fixedly secured to said inertia plate, the first portion of said pivoted member being positioned to engage said spring member until protraction of a predetermined amount of said strap off of said reel, and the second portion of said pivoted member being spaced legs integral with said first portion and extending into slots in said flange and being selectively movable therein.

7. The improvement in the retractor of claim 6 wherein said pivoted member is mounted overcenter on its pivotal axis, the retraction of said strap back onto said reel rotating said flange in a manner moving said pivoted member out of position whereby it is adapted to engage said spring member.

8. The improvement in the retractor of claim 6 wherein said inertia plate is resiliently biased and said first rate of acceleration is determined by the g setting of said resiliently biased inertia plate.

9. The improvement in the retractor of claim 8 wherein said second rate of acceleration is determined by the combined g setting of said resiliently biased inertia plate and said spring member.

10. The improvement in the retractor of claim 9 wherein said third rate of acceleration is determined by a g setting high enough to overcome the combined g settings of said resiliently biased inertia plate, said spring member and the engagement of said spring member by said pivoted member.

11. In a safety belt retractor having a strap receiving reel normally urged into a strap rewind position, locking means including a pawl for locking said reel against protraction, and inertia responsive means for causing lock-up of said pawl upon acceleration of said strap off of said reel at a first rate of acceleration, said inertia responsive means including an inertia plate movable in a plane of movement from a first position out of lock-up with said pawl to a second position into lock-up with said pawl, the improvement comprising the provision of:

pawl lock-up preventing means for preventing operation of said inertia responsive means within a second rate of acceleration of said strap off of said reel above said first rate of acceleration while permitting operation of said inertia responsive means upon acceleration of said strap off of said reel at a third rate of acceleration higher than said second rate of acceleration, said inertia plate having an unobstructed path of movement within said plane of movement during the time said pawl lock-up preventing means prevents said inertia responsive means from locking up with said pawl upon acceleration of said strap off of said reel within said second rate of acceleration above said first rate of acceleration while permitting operation of said inertia responsive means upon acceleration of said strap off of said reel at said third rate of acceleration.

12. In the retractor of claim 11 further including means for releasing said inertia responsive means upon acceleration of said strap off of said reel at said first rate of acceleration after a predetermined amount of said strap has been unwound off of said reel.

13. In the retractor of claim 12 wherein said last-mentioned means is responsive to a retractive movement of said reel after unwinding of a predetermined amount of said strap off of said reel to thereby release said inertia responsive means.

14. The improvement in the retractor of claim 13 wherein said pawl lock-up preventing means includes resilient means fixedly mounted on said plate and a flange connected to said reel for rotation therewith, and a pivoted member pivotally mounted on a past extending from said flange, said pivoted member having spaced legs extending into slots in said flange and being selectively movable therein, a cam portion integral with the other end of said legs, said cam portion being adapted to engage said resilient means, and resilient means biasing said pivoted member into a position adapted to engage said first-mentioned resilient means.

15. The improvement in the retractor of claim 14 wherein said pivoted member is mounted overcenter on said post, the retraction of said strap back onto said reel rotating said flange in a manner moving said pivoted member out of position adapted to engage said first-mentioned resilient means.

16. In a safety belt retractor having a strap receiving spool mounted for rotation in a frame with said spool being urged into a strap wound position and including a lockbar having at least one locking pawl thereon adapted to engage the teeth of a ratchet tooth gear on the spool, inertia responsive means for operating said lock bar in response to an acceleration in spool rotation above a first value, the improvement comprising the provision of:

inertia responsive means operation preventing means operatively connected to said spool and inertia responsive means for preventing operation of said inertia responsive means during an initial strap protractive movement prior to a retractive movement only for a predetermined range of spool acceleration values exceeding said first value whereby said inertia responsive means is responsive to emergency conditions producing spool acceleration values in excess of said range of values to cause lock up of said retractor while preventing inadvertent lock up during protraction of said strap to place it in use.

17. In a safety belt retractor having a strap receiving spool mounted for rotation in a frame with said spool being urged into a strap wound position and including a lockbar having at least one locking pawl thereon adapted to engage the teeth of a ratchet tooth gear on the spool, inertia responsive means adapted to engage said lockbar in response to sudden acceleration of said strap off said spool and move said lockbar to cause said pawl to engage with said teeth, said inertia responsive means including an inertia responsive member movable between pawl locking and pawl unlocking positions, the improvement comprising the provision of:

restricting means operable only through a predetermined range of strap acceleration values for restricting movement of said inertia responsive member during an initial protractive movement of said strap prior to a retractive movement of the strap which deactivates said restricting means whereby normal manual protraction of said strap may be accomplished on an initial protraction of said strap with said restricting means preventing operation of said inertia responsive means while allowing an operation of said inertia responsive means in an overriding action relative to said restricting means when strap acceleration acceeds the upper value of said range.

* * * * *

UNITED STATES PATENT AND TRADEMARK OFFICE
CERTIFICATE OF CORRECTION

PATENT NO. : 3,980,247
DATED : September 14, 1976
INVENTOR(S) : Kuszyncki, Gregory G. et al It is certified that error appears in the above-identified patent and that said Letters Patent are hereby corrected as shown below:

Col. 8, line 30, "plate" should be -member-.
Col. 8, lines 30 through 32, "within a plane of movement from a position out of locking engagement to a" should be -between a pawl locking and a pawl unlocking-.
Col. 8, line 37, after "responsive", -means- should be inserted.
Col. 8, line 45, "plate having an" should be -member being-.
Col. 8, line 45, "path of" should be -in its-.
Col. 8, line 46, "within said plane of movement" should be -between said locking and unlocking position-.
Col. 8, line 53, "responsive means" should be -- member to cause said pawl to engage with said teeth --.
Col. 8, line 60, "beeen inwound" should be -been unwound-.
Col. 8, line 68, "plate" should be -member-.
Col. 9, line 21, cancel "means".
Col. 9, line 62, change "plate" to -member-.
Col. 9, lines 62 through 65, change "in a plane of movement from a first position out of lock-up with said pawl to a second position into lock-up with said pawl" to -between a pawl locking and a pawl unlocking position to cause said pawl to lock said reel against protraction-.
Col. 10, line 6, change "plate having an" to -member being-.
Col. 10, line 7, change "path of" to -in its-.
Col. 10, lines 7 & 8, change "within said plane of movement" to -between pawl locking and unlocking positions-.
Col. 10, line 14, change "responsive means" to -member to cause said pawl to lock said reel-.
Col. 10, line 31, change "past" to -post-.

Signed and Sealed this

First Day of February 1977

[SEAL]

Attest:

RUTH C. MASON
Attesting Officer

C. MARSHALL DANN
Commissioner of Patents and Trademarks